(12) United States Patent
Kocher

(10) Patent No.: US 10,706,697 B1
(45) Date of Patent: Jul. 7, 2020

(54) GUARD DOG STATION

(71) Applicant: Robert William Kocher, McLean, VA (US)

(72) Inventor: Robert William Kocher, McLean, VA (US)

( * ) Notice: Subject to any disclaimer, the term of this patent is extended or adjusted under 35 U.S.C. 154(b) by 0 days.

(21) Appl. No.: 16/501,370

(22) Filed: Apr. 2, 2019

Related U.S. Application Data

(60) Provisional application No. 62/762,075, filed on Apr. 19, 2018.

(51) Int. Cl.
| | | |
|---|---|---|
| *G08B 13/196* | (2006.01) | |
| *G06F 16/583* | (2019.01) | |
| *H04N 5/225* | (2006.01) | |
| *G08B 7/06* | (2006.01) | |
| *H04R 1/02* | (2006.01) | |
| *G06F 3/16* | (2006.01) | |
| *H04N 7/18* | (2006.01) | |

(52) U.S. Cl.
CPC ........... *G08B 13/196* (2013.01); *G06F 3/165* (2013.01); *G06F 16/5854* (2019.01); *G08B 7/06* (2013.01); *H04N 5/2253* (2013.01); *H04N 7/181* (2013.01); *H04R 1/025* (2013.01)

(58) Field of Classification Search
CPC ........ G08B 13/196; G08B 15/00; G08B 7/06; G06F 16/5854; G06F 3/165; H04N 5/2253; H04N 7/181; H04R 1/025
See application file for complete search history.

(56) References Cited

U.S. PATENT DOCUMENTS

| | | | |
|---|---|---|---|
| 2011/0046920 A1* | 2/2011 | Amis ..................... | G01S 19/16 702/181 |
| 2012/0319840 A1* | 12/2012 | Amis ................... | G08B 25/016 340/540 |
| 2012/0319841 A1* | 12/2012 | Amis ................... | G08B 25/016 340/540 |
| 2012/0319842 A1* | 12/2012 | Amis ................... | G08B 25/016 340/540 |
| 2013/0088352 A1* | 4/2013 | Amis ................... | G08B 15/002 340/540 |
| 2013/0229281 A1* | 9/2013 | Amis ..................... | G08B 13/16 340/540 |
| 2013/0234851 A1* | 9/2013 | Amis ................... | G08B 15/001 340/539.13 |
| 2014/0118140 A1* | 5/2014 | Amis ..................... | G08B 25/08 340/539.13 |
| 2014/0118144 A1* | 5/2014 | Amis ..................... | G08B 21/02 340/540 |

(Continued)

*Primary Examiner* — Orlando Bousono

(57) ABSTRACT

A guard dog station for preventing entrance to a venue of individuals identified as not eligible to enter. The guard dog station has at least one camera extending to a height of the face of an average person. A processor within the guard dog station is connected to the at least one camera. The processor being connected to a database that contains images and names of individuals who are authorized or not authorized to enter the venue. A speaker mounted on the guard dog station produces the sound of a barking dog in response to identification of an unauthorized individual. Additionally provided is a laptop for the guard to view images of individuals approaching the guard dog station who are or are not authorized to enter the venue.

20 Claims, 4 Drawing Sheets

(56) References Cited

U.S. PATENT DOCUMENTS

| | | | |
|---|---|---|---|
| 2014/0120977 A1* | 5/2014 | Amis | H04W 4/023 455/521 |
| 2015/0109104 A1* | 4/2015 | Fadell | G08B 27/003 340/5.65 |
| 2015/0109112 A1* | 4/2015 | Fadell | G08B 27/003 340/328 |
| 2015/0109128 A1* | 4/2015 | Fadell | G08B 27/003 340/540 |
| 2015/0112885 A1* | 4/2015 | Fadell | G08B 25/008 705/330 |
| 2015/0116106 A1* | 4/2015 | Fadell | G08B 19/005 340/501 |
| 2015/0116107 A1* | 4/2015 | Fadell | G08B 19/005 340/501 |
| 2015/0116108 A1* | 4/2015 | Fadell | G08B 19/005 340/501 |
| 2015/0116109 A1* | 4/2015 | Fadell | G08B 19/005 340/501 |
| 2015/0120015 A1* | 4/2015 | Fadell | G08B 19/005 700/90 |
| 2015/0120596 A1* | 4/2015 | Fadell | G08B 27/003 705/330 |
| 2015/0120598 A1* | 4/2015 | Fadell | G06Q 10/083 705/333 |
| 2015/0127712 A1* | 5/2015 | Fadell | G06Q 10/083 709/202 |
| 2015/0145643 A1* | 5/2015 | Fadell | G08B 27/003 340/5.51 |
| 2015/0154850 A1* | 6/2015 | Fadell | G06Q 10/083 340/501 |
| 2015/0156030 A1* | 6/2015 | Fadell | H04L 12/2816 700/90 |
| 2015/0156031 A1* | 6/2015 | Fadell | H04L 12/2816 700/276 |
| 2016/0065155 A1* | 3/2016 | Bharj | H03G 1/02 381/105 |
| 2016/0352299 A1* | 12/2016 | Bharj | H03G 1/02 |

* cited by examiner

GUARD DOG STATION

CROSS-REFERENCE TO RELATED APPLICATIONS

None

BACKGROUND

Field of the Invention

This invention relates to a guard dog station designed to keep certain individuals from entering a venue, such as a building, hotel, casino, etc.

Description of the Related Art

It is common for venues such as office buildings, casinos, etc. to want to keep certain individuals from entering the premises. The people who are to be denied entry are generally individuals who have a criminal history or troubled history with the venue or other venues. Examples of such individuals are individuals who have cheated, robbed, broken into hotel rooms, apartments, etc. and who the management wants to ensure that they are unable to enter the venue.

In the past, it was presumed that individuals having a room key or similar key should be allowed to enter past the guard station and enter the venue. The problem with this is that if an individual steals a key or key card from someone staying at the venue, or steals a key from a car that belongs from someone staying at the venue, or finds a key card on the floor inside or outside the venue, they would be able to enter and perhaps break into and rob a room or rob, kidnap, etc., individuals staying at the venue. If a patron has their room robbed, they may be hesitant to visit the venue in the future; which is something the management wants and understandably needs to avoid.

Generally, venues such as casinos, department stores, hotels, etc, know who many of the known criminals are and seek to keep them out of their venue for the protection of both their guests and for protection of the venue itself. Thus, there is a need for a system that will keep out known undesirables, such as thieves, while allowing other guests to enter a venue.

Identifying whether or not a person or persons should be allowed to enter a venue normally involves showing the guard, at the guard station, a key, key card, badge, uniform or some sort of visual signature or identification. State of the art technology includes facial recognition. In the current state of the art, facial matching technology generally utilizes one or more photographs. Many devices will perform a match and present a photograph to a guard so that the guard can look at the photograph and see if the photograph presented to the guard appears to be a proper match. This operation in the current state of the art has disadvantages. A first disadvantage is that it requires the guard to make a decision from an image on a small screen. A second disadvantage is that the algorithm used to identify a match cannot have a very high match rate, because matching scores from a single live scan of a single face are low due to the varying three-dimensional angles of the face taken during a live-scan.

In addition, if more than one person is identified at around the same time at the guard station as possibly be someone who should not enter, some others might get by the guard and enter because there are only so many people that can be checked at a given time. Moreover, it is important to be able to recognize individuals who are not allowed to enter a venue and have them leave without disturbing the guests of the venue.

SUMMARY

It is an object of the invention to provide a guard station that will prevent the wrong individuals from entering a venue without disturbing guests and generally without having to call security for assistance. In one exemplary embodiment, the guard station has, in addition to a guard, one or more cameras located at around face height for an average adult. The cameras take pictures of individuals approaching the guard station. The pictures may include the iris of an individual in addition to a picture of each approaching individual's face. The station may also include a facial attractor, which may be a mirror or small blinking light that will cause approaching individuals to look toward the cameras for easier identification of the individual or individuals. Each of the one or more cameras will be connected to a processor, a memory and at least one database which includes images of individuals who are not permitted to enter the venue. Processing circuitry and firmware will include a sound synthesizer and a speaker mounted in or near the guard station. The speaker will produce the sound of a large barking dog when an individual approaching the guard station is preliminarily identified as someone who should not be allowed to enter the venue. In addition to the sound of the barking dog, which creates the name "guard dog station," as the title of the invention, the guard may cause a siren to sound, along with some flashing lights. Other sound, light etc. sources may be provided as would be understood by one of ordinary skill in the art.

The guard will be looking at a laptop located below the top of the guard station and will see the photograph of the person preliminarily identified as someone who should not be able to enter the venue. The guard will then ask the person to approach the guard dog station and show identification. When the individual approaches the station, the camera will take a closer picture and if the individual appears matched with someone who should not be allowed to enter, a second image of the person and their name will show up on the laptop for the guard to see. However, because the live images may not be 100% accurate, the guard will personally review the identification provided before making a final decision as to whether the person can be permitted to enter the venue.

As to whether the initial identification will sound a siren and/or flashing light, etc. in addition to the barking dog, the guard dog station will have one or more response buttons to push to activate the siren, flashing light, etc.

In another exemplary embodiment, a response button allows the guard to call other guards for backup, close an open door, lock a revolving door, lower a gate, etc. in order to prevent an individual from entering the venue.

Another exemplary embodiment includes a guard dog station system for preventing individuals identified as not eligible to enter a venue from entering the venue, while minimizing disruption to guests of the venue, the guard dog station including a guard dog station; at least one camera extending upwardly from the guard dog station to a height of the face of an average person; a processor within the guard dog station; the at least one camera being connected to the processor; the processor being connected to a database that contains images and names of individuals who are on a watch list and are not authorized to enter the venue; a speaker mounted on the guard dog station; the speaker being configured to produce the sound of a barking dog in response to preliminary identification by the processor of an individual who is not authorized to enter the venue; and a laptop within the rear of the guard dog station which is positioned for the guard behind the guard dog station to see images of individuals approaching the guard dog station who are or are not authorized to enter the venue.

A further exemplary embodiment provides a guard dog station system for preventing individuals who are identified as not eligible to enter a venue from entering the venue while minimizing disruption to guests of the venue, the guard dog station including a guard dog station; at least one camera extending upwardly from the guard dog station to a height of the face of an average person; a processor within the guard dog station; the at least one camera being connected to the processor; the processor being connected to a database that contains images and names of individuals who are on a watch list and are not authorized to enter the venue; a speaker mounted on the guard dog station; the speaker being configured to produce the sound of a barking dog in response to preliminary identification by the processor of an individual who is not authorized to enter the venue; a laptop within the rear of the guard dog station which is positioned for the guard behind the guard dog station to see images of individuals approaching the guard dog station who are or are not authorized to enter the venue; a revolving or non-revolving door adjacent the guard dog station; and a push button on the guard dog station; wherein the push button is configured to allow the guard to lock the revolving or non-revolving door in order to prevent an unauthorized individual from entering the venue.

Figure 1:
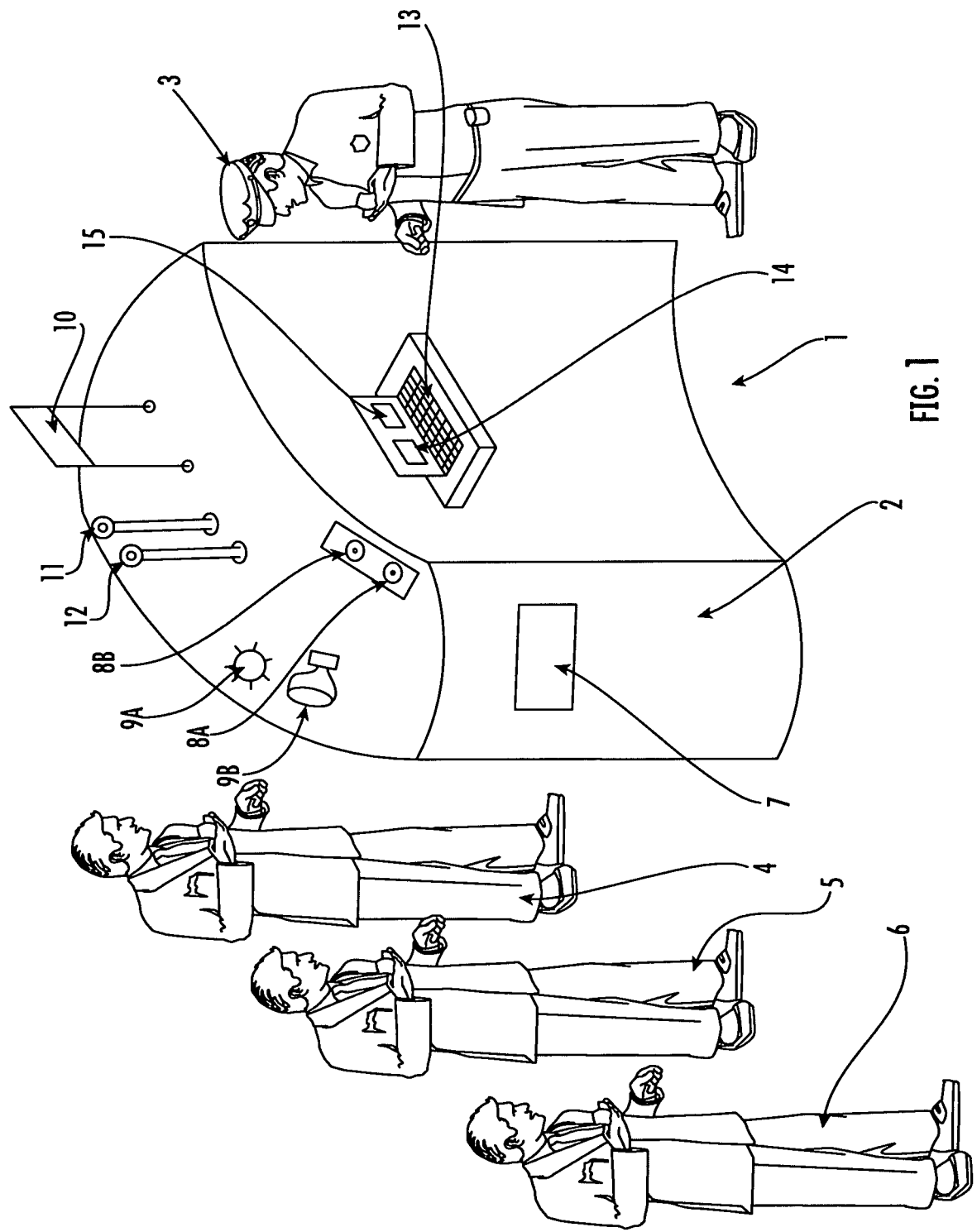
FIG. 1 illustrates a side view of one exemplary embodiment of a guard dog station.

DRAWING REFERENCE NUMERALS 1 guard dog station
2 exterior structure of the guard dog station
3 guard
4 individuals approaching the guard dog station
5 another individual approaching the guard dog station
6 yet another individual approaching the guard dog station
7 processing equipment within the structure of the guard dog station
8A response button
8B response button
8C response button
9A Flashing light
9B siren/horn
10 facial attractor
11 camera
12 camera
13 laptop
14 picture of preliminary match
15 picture of apparent match with the individual's name below their image
16 barking dog speaker
17 open door to the venue
18A door frame
18B door frame
18C wall attached to the door frame
19A wall attached to door frame
19B wall attached to opposite door frame
20A frame of a gate
20B opposite frame of the gate
21 gate
22 frame of a revolving door
23 opposite frame of a revolving door
24 wall attached to revolving door frame
25 revolving door
26 top frame of the guard dog station

DETAILED DESCRIPTION OF THE EXEMPLARY EMBODIMENTS

FIG. 1 depicts an exemplary embodiment of a guard dog station in accordance with Applicant's invention. As shown in FIG. 1, an exemplary guard dog station is illustrated as element 1. The outside structure of the guard dog station is labeled as 2. A representation of a guard, placed at the guard dog station 1, is illustrated as 3. Three individuals approaching the guard dog station are labeled 4-6, respectively. These are individuals that the guard has to verify whether or not they should be allowed to enter the venue.

Processing equipment for determining whether approaching individuals are okay to be permitted to enter the venue or must be turned away, is illustrated as 7. The processing equipment will also activate the barking dog sound through speaker 16 (illustrated in FIGS. 2-4). The processing equipment additionally includes a database of individuals who may not enter the premises. In operation, a picture of the person who may not enter will appear on the screen of the laptop and the guard dog will bark. A flashing light 9B and/or a siren/horn 9B may be activated by the guard, at the guard's discretion, upon determination that an approaching individual is preliminarily identified by the processor 7 as someone who may not enter the venue.

At this time, the dog will bark and the guard may activate the siren/horn or the flashing light, etc. by pressing on response buttons 8A and 8B, while asking the individual to approach the guard dog station and show identification. As the person approaches the guard dog station, a better image will be taken.

If the processor indicates a potential match using the better image, the person's name will appear below their image as a second image displayed on the laptop. The identification shown to the guard will result in a final identification by the guard of whether the individual may enter the venue. The face attractor 10 includes either a mirror or a small light to attract an approaching individual to make it easier to have the cameras take a picture of the individual for comparison with a watch list of wanted individuals on the database of individuals who may not enter the venue.

Cameras 11 and 12 take the picture of the approaching individual for comparison with the images in the database attached to the processor 7. Although FIG. 1 appears to show the processor at the side of the guard dog station, the processor is actually inside the guard dog station behind a panel on the side of the station.

Alternately, the processing equipment may be located anywhere reasonable, so long as the processing equipment is not accessible to approaching individuals.

Note that the purpose of the guard dog station is not to disrupt guests or to apprehend the individual if they may not enter the venue, but rather to simply keep unwanted individuals from entering the venue.

Figure 2:
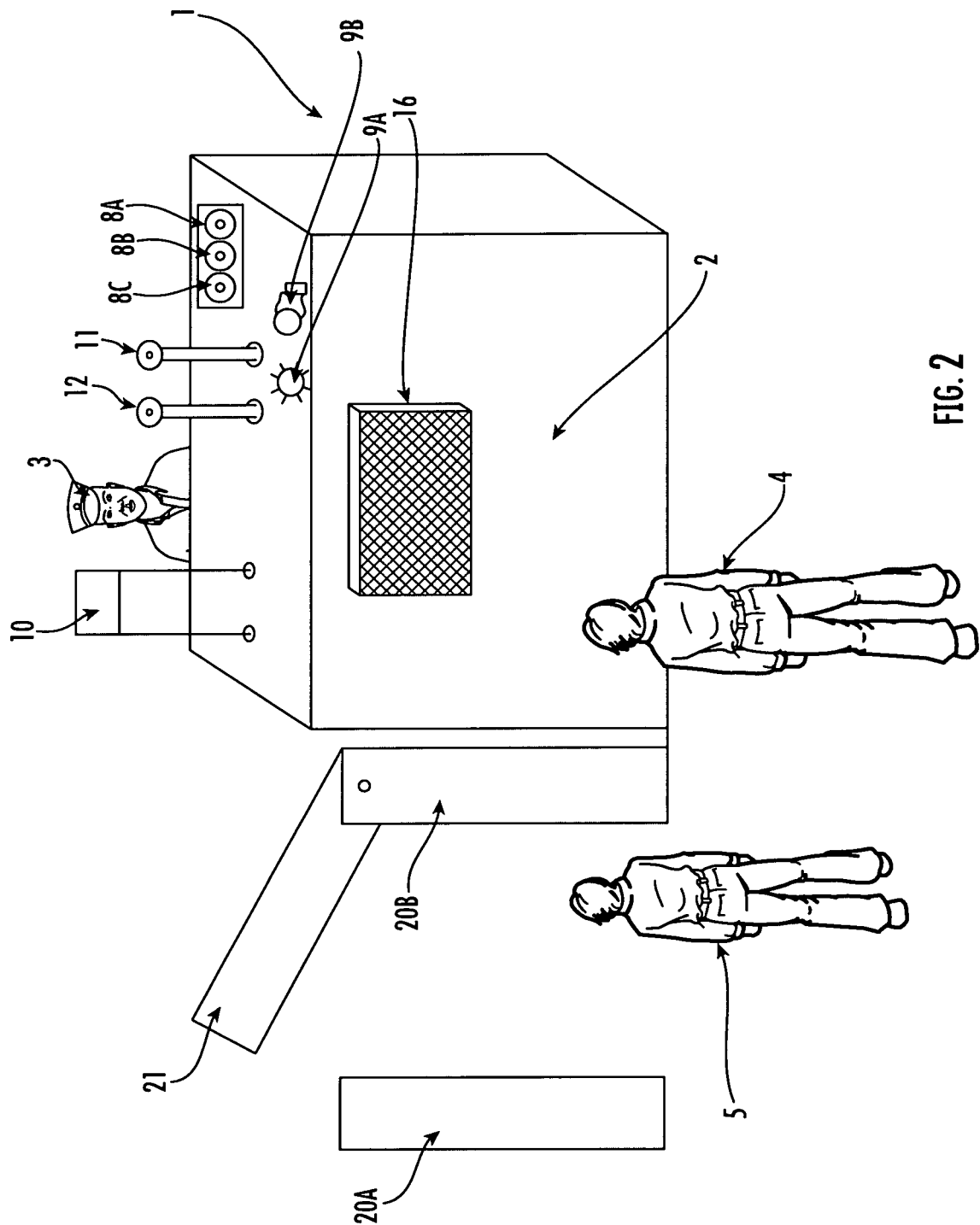
FIG. 2 illustrates a front view of another exemplary embodiment of a guard dog station.

Turning to the exemplary embodiment of FIG. 2, this embodiment has the additional feature of having a gate 21 that can be closed by the guard by pressing on response button 8C. Thus, in response to a determination that an approaching individual should not be permitted to enter the venue, the guard may close the gate to prevent entry, while the guard reviews the individual's identification and the camera takes another picture as part of the process of determining whether the individual may enter the venue. On the sides of the gate 21 are gate support portions 20A and 20B.

Figure 3:
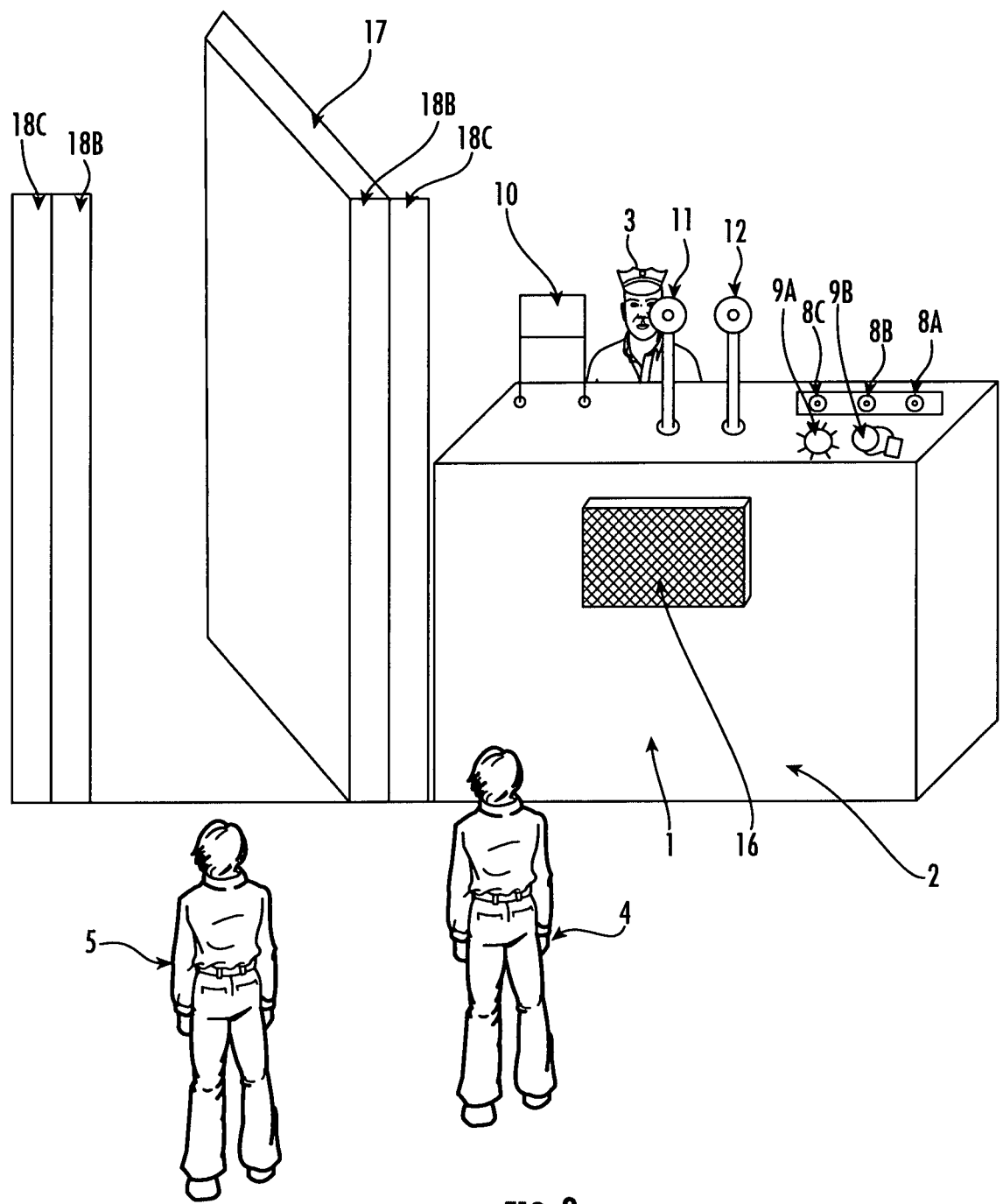
FIG. 3 illustrates a front view of a further exemplary embodiment of a guard dog station.

Turning to FIG. 3, this exemplary embodiment provides an alternate embodiment where a door 17 may be locked by the guard while a final determination is made of whether the individual approaching the guard dog station should be able to enter the venue. Door 17 is surrounded by door frames 18B and walls 18C attached to the door frames 18B.

Figure 4:
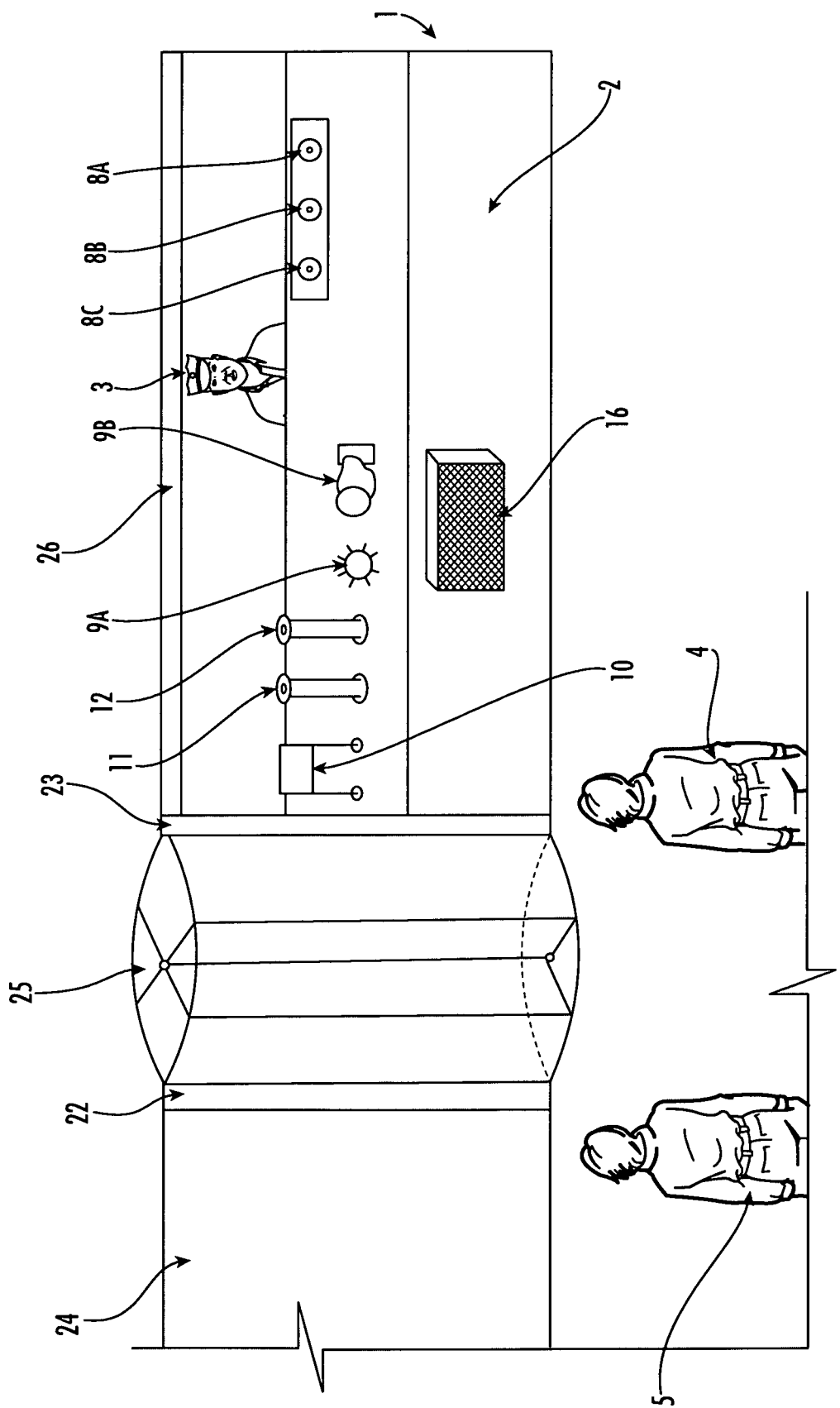
FIG. 4 illustrates a front view of yet another exemplary embodiment of a guard dog station.

Turning to FIG. 4, this exemplary embodiment has an alternative feature of a revolving door 25, surrounded by door frames 22 and 23, with frame 22 being connected to a wall 24. The guard 3 has the ability to lock the revolving door to keep an individual or individuals from entering the venue while the determination is being made as to whether they should be allowed to enter the venue. The gate is operated by response button 8C.

Although exemplary embodiments have been shown above, other exemplary embodiments can readily be used as would be understood by an artisan. The exemplary embodiments should not be considered to be limiting of the invention in any way, as the invention is only limited by the scope of the appended claims.

The invention claimed is:

1. A guard dog station system for preventing individuals identified as not eligible to enter a venue from entering the venue, while minimizing disruption to guests of the venue, the guard dog station system comprising: a) a guard dog station; b) at least one camera extending upwardly from the guard dog station to a height of a face of an average person; c) a processor within the guard dog station; the at least one camera being connected to the processor; the processor being connected to a database that contains images and names of individuals who are on a watch list and are not authorized to enter the venue; d) a speaker mounted on the guard dog station; the speaker being configured to produce a sound of a barking dog in response to preliminary identification by the processor of an individual who is not authorized to enter the venue; and e) a laptop within a rear portion of the guard dog station which is positioned for a guard behind the guard dog station to see images of individuals approaching the guard dog station who are or are not authorized to enter the venue.

2. The guard dog station of claim 1, further comprising:
a) a face attractor located at the guard dog station and configured to catch the attention of individuals approaching the guard dog station.

3. The guard dog station of claim 1, further comprising:
a) a siren mounted on the guard dog station for sounding a siren sound in response to a preliminary detection of an individual approaching the guard dog station as someone who is not authorized to enter the venue.

4. The guard dog station of claim 1, further comprising:
a) a flashing light on the guard dog station for flashing a light in response to a determination that an individual approaching the guard dog station is not authorized to enter the venue.

5. The guard dog station of claim 3, further comprising:
a) a response button on the guard dog station configured to be pushed by the guard to turn on the siren in response to a preliminary determination that an individual approaching the guard dog station is not authorized to enter the venue.

6. The guard dog station of claim 4, further comprising:
a) a response button on the guard dog station that is configured to be pushed by the guard to turn on the flashing light in response to a preliminary determination that an individual approaching the guard dog station is not authorized to enter the venue.

7. The guard dog station of claim 2, wherein the face attractor is a mirror.

8. The guard dog attractor of claim 2, wherein the face attractor is a small flashing light configured to cause approaching individuals to look at the face attractor so the at least one camera can take a picture of the individual for identification purposes.

9. A guard dog station system for preventing individuals who are identified as not eligible to enter a venue from entering the venue while minimizing disruption to guests of the venue, the guard dog station system comprising: a) a guard dog station; b) at least one camera extending upwardly from the guard dog station to a height of a face of an average person; c) a processor within the guard dog station; the at least one camera being connected to the processor; the processor being connected to a database that contains images and names of individuals who are on a watch list and are not authorized to enter the venue; d) a speaker mounted on the guard dog station; the speaker being configured to produce a sound of a barking dog in response to preliminary identification by the processor of an individual who is not authorized to enter the venue; e) a laptop within a rear portion of the guard dog station which is positioned for a guard behind the guard dog station to see images of individuals approaching the guard dog station who are or are not authorized to enter the venue; and f) a revolving or non-revolving door adjacent the guard dog station; g) a push button on the guard dog station; wherein the push button is configured to allow the guard to lock the revolving or non-revolving door in order to prevent an unauthorized individual from entering the venue.

10. The guard dog station of claim 9, further comprising:
a) a face attractor located at the guard dog station and configured to catch the attention of individuals approaching the guard dog station.

11. The guard dog station of claim 9, further comprising:
a) a siren mounted on the guard dog station for sounding a siren sound in response to a preliminary detection of an individual approaching the guard dog station as someone who is not authorized to enter the venue.

12. The guard dog station of claim 9, further comprising:
a) a flashing light on the guard dog station for flashing a light in response to a determination that an individual approaching the guard dog station is not authorized to enter the venue.

13. The guard dog station of claim 11, further comprising:
a) a response button on the guard dog station, the response button being configured to be pushed by the guard to turn on the siren in response to a preliminary determination that an individual approaching the guard dog station is not authorized to enter the venue.

14. The guard dog station of claim 12, further comprising:
a) a response button on the guard dog station that is configured to be pushed by the guard to turn on the flashing light in response to a preliminary determination that an individual approaching the guard dog station is not authorized to enter the venue.

15. The guard dog station of claim 10, wherein the face attractor is a mirror.

16. The guard dog attractor of claim 10, wherein the face attractor is a small flashing light configured to cause approaching individuals to look at the face attractor so the at least one camera can take a picture of the individual for identification purposes.

17. A guard dog station system for preventing individuals identified as not eligible to enter a venue from entering the venue while minimizing disruption to guests of the venue, the guard dog station system comprising: a) a guard dog station; b) at least one camera extending upwardly from the guard dog station to a height of a face of an average person; c) a processor within the guard dog station; the at least one camera being connected to the processor; the processor being connected to a database that contains images and names of individuals who are on a watch list and are not authorized to enter the venue; d) a speaker mounted on the guard dog station; the speaker being configured to produce a sound of a barking dog in response to preliminary identification by the processor of an individual who is not authorized to enter the venue; e) a laptop within a rear portion of the guard dog station which is positioned for a guard behind the guard dog station to see images of individuals approaching the guard dog station who are or are not authorized to enter the venue; and f) a gate adjacent the guard dog station; g) a response button on the guard dog station, wherein the response button is configured to be pushed by the guard to close the gate in order to prevent an unauthorized person from entering the venue.

18. The guard dog station of claim 17, further comprising: a) a face attractor located at the guard dog station and configured to catch the attention of individuals approaching the guard dog station for photographing their image by the at least one camera; b) a siren mounted on the guard dog station for sounding a siren sound in response to a preliminary detection of an individual approaching the guard dog station as someone who is not authorized to enter the venue; and c) a response button on the guard dog station configured to be pushed by the guard to turn on the siren in response to a preliminary determination that an individual approaching the guard dog station is not authorized to enter the venue.

19. The guard dog station of claim 17, further comprising: a) a flashing light on the guard dog station for flashing a light in response to a determination that an individual approaching the guard dog station is not loping authorized to enter the venue; and b) a response button on the guard dog station that is configured to be pushed by the guard to turn on the flashing light in response to a preliminary determination that an individual approaching the guard dog station is not authorized to enter the venue.

20. The guard dog station of claim 18, wherein the face attractor is a mirror or a small flashing light which is configured to cause an individual approaching the guard dog station to look toward the face attractor so their picture can be taken.

* * * * *